US009116724B2

(12) United States Patent
Bonnet et al.

(10) Patent No.: US 9,116,724 B2
(45) Date of Patent: Aug. 25, 2015

(54) STATELESS VIRTUAL MACHINE

(75) Inventors: Michael S. Bonnet, Boston, MA (US);
Vitaly Elyashev, Ramat Gan (IL); Omer Frenkel, Tel Aviv (IL); Miki Kenneth, Tel Aviv (IL)

(73) Assignee: Red Hat, Inc., Raleigh, NC (US)

( * ) Notice: Subject to any disclaimer, the term of this patent is extended or adjusted under 35 U.S.C. 154(b) by 525 days.

(21) Appl. No.: 12/550,226

(22) Filed: Aug. 28, 2009

(65) Prior Publication Data

US 2010/0293146 A1    Nov. 18, 2010

Related U.S. Application Data

(63) Continuation-in-part of application No. 12/466,631, filed on May 15, 2009.

(51) Int. Cl.
*G06F 17/30* (2006.01)
*G06F 9/455* (2006.01)
*G06F 9/445* (2006.01)

(52) U.S. Cl.
CPC . *G06F 9/455* (2013.01); *G06F 8/60* (2013.01)

(58) Field of Classification Search
USPC ............................................. 718/1; 707/639
See application file for complete search history.

(56) References Cited

U.S. PATENT DOCUMENTS

| 8,141,075 | B1 * | 3/2012 | Chawla et al. ..................... 718/1 |
| 2005/0060590 | A1 * | 3/2005 | Bradley et al. ................. 713/320 |
| 2005/0108709 | A1 * | 5/2005 | Sciandra et al. .................. 718/1 |
| 2006/0230156 | A1 * | 10/2006 | Shappir et al. ................ 709/227 |
| 2008/0022032 | A1 * | 1/2008 | Nicholas et al. .............. 711/100 |
| 2008/0155169 | A1 * | 6/2008 | Hiltgen et al. .................... 711/6 |
| 2008/0288938 | A1 | 11/2008 | DeHaan |
| 2009/0006728 | A1 * | 1/2009 | Green .......................... 711/104 |
| 2009/0031303 | A1 * | 1/2009 | Frank ................................. 718/1 |
| 2009/0037925 | A1 * | 2/2009 | Jacobs et al. .................. 718/105 |
| 2009/0044265 | A1 * | 2/2009 | Ghosh et al. .................... 726/14 |
| 2009/0125902 | A1 * | 5/2009 | Ghosh et al. ..................... 718/1 |
| 2009/0144515 | A1 * | 6/2009 | Benari .......................... 711/162 |
| 2009/0222922 | A1 * | 9/2009 | Sidiroglou et al. ............. 726/23 |
| 2009/0260007 | A1 * | 10/2009 | Beaty et al. ....................... 718/1 |
| 2010/0049930 | A1 * | 2/2010 | Pershin et al. ................ 711/162 |
| 2010/0058042 | A1 * | 3/2010 | Locker et al. ..................... 713/2 |
| 2010/0262794 | A1 * | 10/2010 | De Beer et al. ............... 711/162 |
| 2010/0293144 | A1 | 11/2010 | Bonnet |

OTHER PUBLICATIONS

Manual entitled "GSX Server 3: Enterprise-Class Virtual Infrastructure for Intel-Based Servers: Virtual Machine Guide", by VMware, Copyright 2004.*
Article entitled "Managing Stateless Virtual Desktops" by Beveridge, dated Jul. 2008.*
Article entitled "The Magic of Nonpersistent Drives in VMware" by Jim, dated Oct. 10, 2006.*

(Continued)

*Primary Examiner* — Mahesh Dwivedi
(74) *Attorney, Agent, or Firm* — Lowenstein Sandler LLP

(57) ABSTRACT

Some embodiments of using snapshotting and virtualization to perform tasks in a known and reproducible environment have been presented. A computing device generates a temporary snapshot of a state of a virtual machine. A session of the virtual machine is started on the computing device using the temporary snapshot. The temporary snapshot is automatically destroyed when the session is terminated, wherein any changes made to the state during the session are removed by destroying the temporary snapshot.

20 Claims, 8 Drawing Sheets

(56) References Cited

OTHER PUBLICATIONS

Amazon Web Services, "Amazon Elastic Compute Cloud (Amazon EC2)", accessed at http://aws.amazon.com/ec2/ on Jun. 10, 2009, 8 pages.

"Solid Ice$^{TM}$ Provisioning Manager", Apr. 2008, pp. 1-5, Qumranet, Inc.

Red Hat Office Action for U.S. Appl. No. 12/466,631, mailed Aug. 25, 2011.

USPTO Office Action for U.S. Appl. No. 12/466,631, mailed Dec. 12, 2011.

* cited by examiner

US 9,116,724 B2

STATELESS VIRTUAL MACHINE

RELATED APPLICATIONS

The present application is a continuation-in-part application of U.S. patent application Ser. No. 12/466,631, entitled "Using Storage Snapshotting And Virtualization To Perform Tasks In A Known And Reproducible Environment," and filed on May 15, 2009.

TECHNICAL FIELD

Embodiments of the present invention relate to computing environment, and more specifically to providing a known and reproducible computing environment using snapshotting and virtualization.

BACKGROUND

Today, virtualization of computing resources has been gaining popularity because of increased operational flexibility. Broadly speaking, virtualization is emulation of physical hardware. A virtual machine, thus, refers to generally a software implementation of a machine that executes programming instructions to perform operations and tasks as if executed by a physical machine, such as a personal computer. One or more virtual machines may run on a single physical machine. A virtual machine may be a virtual host or a virtual guest. In some conventional systems, the virtual host and the virtual guests are all virtual machines running under the hypervisor, which is a virtualization controller running on the physical machine.

When a virtual machine is started, an appropriate operating system and software tools are installed on the virtual machine in order to allow the virtual machine to perform a particular class of operations. Different classes of operations may require different operating systems and/or tools. However, this process of starting a virtual machine may become burdensome and tedious in the context of software testing because frequently, multiple instances of virtual machines have to be started to test different versions of software. Furthermore, the virtual machines have to be manually set up and checked to ensure that they have the same computing environment. Such a manual process can be tedious and error-prone.

BRIEF DESCRIPTION OF THE DRAWINGS

The present invention is illustrated by way of example, and not by way of limitation, in the figures of the accompanying drawings and in which.

DETAILED DESCRIPTION

Figure 1A:
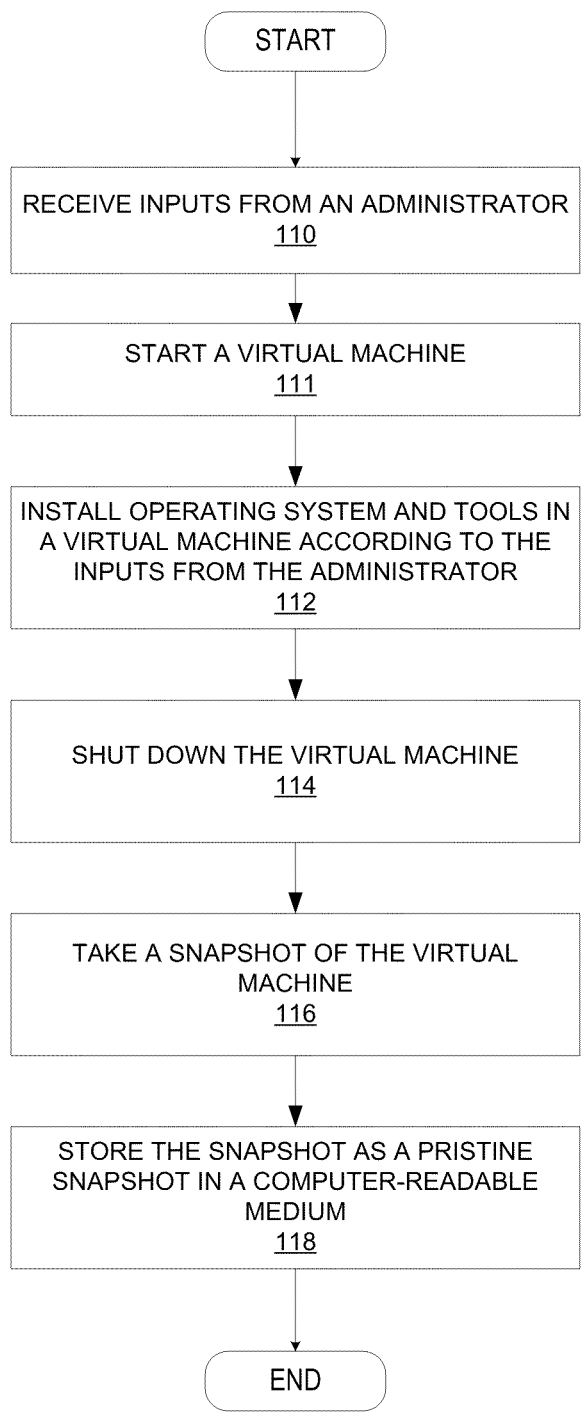
FIG. 1A illustrates a flow diagram of one embodiment of a method to create a pristine snapshot.

Described herein are some embodiments of a method and an apparatus to perform tasks in a known and reproducible environment using snapshotting and virtualization. In one embodiment, a computing device generates a temporary snapshot of a state of a virtual machine. A session of the virtual machine is started on the computing device using the temporary snapshot. The temporary snapshot is automatically destroyed when the session is terminated. Any changes made to the state during the session are removed by destroying the temporary snapshot.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions below are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

The present invention also relates to apparatus for performing the operations herein. This apparatus may be specially constructed for the required purposes, or it may comprise a general-purpose computer selectively activated or reconfigured by a computer program stored in the computer. Such a computer program may be stored in a machine-readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the required operations. The required structure for a variety of these systems will appear from the description below. In addition, the present invention is not described with reference to any particular programming language. It will be appreciated that a variety of programming languages may be used to implement the teachings of the invention as described herein.

Figure 5:
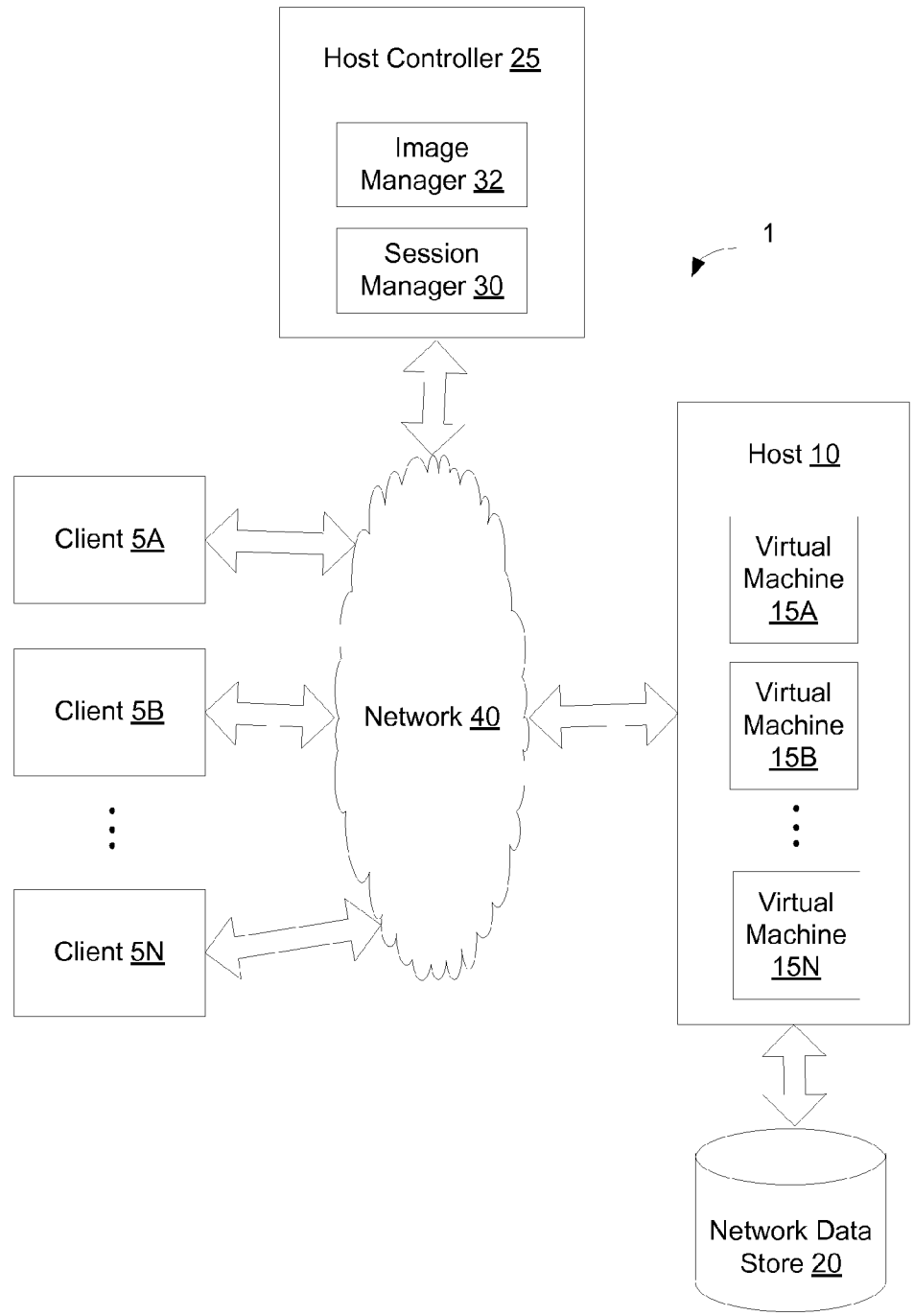
FIG. 5 illustrates a block diagram of an exemplary network, in which embodiments of the present invention may operate.

FIG. 5 illustrates a block diagram of an exemplary network architecture 1, in which embodiments of the present invention may operate. The network architecture 1 includes multiple clients (client 5A, client 5B through client 5N) connected with a host 10 and a host controller 25 via a network 40. The network 40 may be a private network (e.g., a local area network (LAN), wide area network (WAN), etc.) or a public network (e.g., the Internet).

Each client 5A, 5B, 5N may be a personal computer (PC), palm-sized computing device, personal digital assistant (PDA), etc. Clients 5A, 5B, 5N may be fat clients (clients that perform local processing and data storage), thin clients (clients that perform minimal or no local processing and minimal to no data storage), and/or hybrid clients (clients that perform local processing but little to no data storage). In one embodiment, clients 5A, 5B, 5N are not configured with local desktop environments. Instead, clients 5A, 5B, 5N are configured to obtain their desktop environments from the host 10. In such an embodiment, clients 5A, 5B, 5N may essentially act as input/output devices, in which a user can view a desktop environment (e.g., a running instance of an operating system including storage available to the operating system and programs installed and/or running on the operating system) on a monitor, and interact with the desktop environment via a keyboard, mouse, microphone, etc. A majority of the processing is not performed at the clients 5A, 5B, 5N, and is instead performed by virtual machines 15A, 15B, 15N hosted by the host 10.

Host 10 is a server that hosts one or more virtual machines 15A, 15B, 15N. Host 10 may be a single server or a cluster of servers. Each virtual machine 15A, 15B, 15N hosted by host 10 has one or more applications executed and hosted by a guest operating system (not shown) within the virtual machine. Multiple guest operating systems and the associated virtual machines (e.g., virtual desktops) may be controlled by another operating system (also referred to as a host OS). Typically, a host OS represents a virtual machine monitor (VMM) (also referred to as a hypervisor) for monitoring the hosted virtual machines. A guest OS may be of the same or different type with respect to the host OS. For example, a guest OS may be a Windows operating system from Microsoft and a host OS may be a Linux operating system available from Red Hat. In addition, the guest OSes running on the host 10 can be of the same or different types.

In one embodiment, host 10 is a virtual desktop server. A virtual desktop server is a server or cluster of servers that run a specific type of virtual machine referred to herein as virtual desktops. Virtual desktops include the same functionality as regular desktops (e.g., processes such as word processing applications, spreadsheets, email, etc. can be run, applications can be installed, and so forth). However, rather than these functions being performed at the client 5A, 5B, 5N, they are instead performed by a virtual machine 15A, 15B, 15N hosted by the host 10. A virtual desktop can represent an output (e.g., an image to be displayed) generated by a desktop application running within a virtual machine. Graphics data associated with the virtual desktop can be captured and transmitted to a client 5A, 5B, 5N, where the virtual desktop may be rendered by a rendering agent and presented by a client application (not shown).

In one embodiment, virtual machines 15A, 15B, 15N communicate with clients 5A, 5B, 5N using a multichannel protocol (e.g., Remote Desktop Protocol (RDP), Simple Protocol for Independent Computing Environments (SPICE™ from Red Hat, etc.) that allows for connection between the virtual machine and end-user devices of the client via individual channels. The virtual machines 15A, 15B, 15N may include a virtual device for each end user device to allow virtual desktop access to control and management functions of the client 5A, 5B, 5N.

Host 10 is connected with a network data store 20. Any changes that are made to virtual machines 15A, 15B, 15N during active sessions for those virtual machines can be stored in the network data store 20. Accordingly, clients 5A, 5B, 5N need only minimal local storage (not shown). Network data store 20 may be a network attached storage (NAS), storage area network (SAN), or a combination thereof.

Host controller 25 is a server that manages the host 10 and/or the virtual machines 15A, 15B, 15N in the host. The host controller 25 includes a provisioning manager 30 that provisions virtual machines for clients. Provisioning a virtual machine includes determining a virtual machine to use for the client and causing the host 10 to load the virtual machine. Provisioning a virtual machine may include determining whether a requested virtual machine is available (e.g., is not presently being used by another client), and loading the virtual machine if it is available. Provisioning a virtual machine may also include creating a new virtual machine from scratch (e.g., generating a virtualized system, installing an operating system on the system, installing applications on the operating system, etc.) if an appropriate virtual machine cannot be found in network data store 20. In one embodiment, provisioning a virtual machine includes sending a message to the client that identifies how to connect with the virtual machine (e.g., an IP address of the virtual machine).

When a client 5A, 5B, 5N needs a virtual desktop (e.g., when it is booted up), the client sends a request for a virtual desktop to the host controller 25. The client may request a specific virtual desktop (e.g., if a user of the client has their own personal virtual desktop). Alternatively, the client may request a generic virtual desktop, which may be an available desktop from a pool of virtual desktops. In response to the request, the provisioning manager 30 provisions the requested virtual machine.

Figure 6:
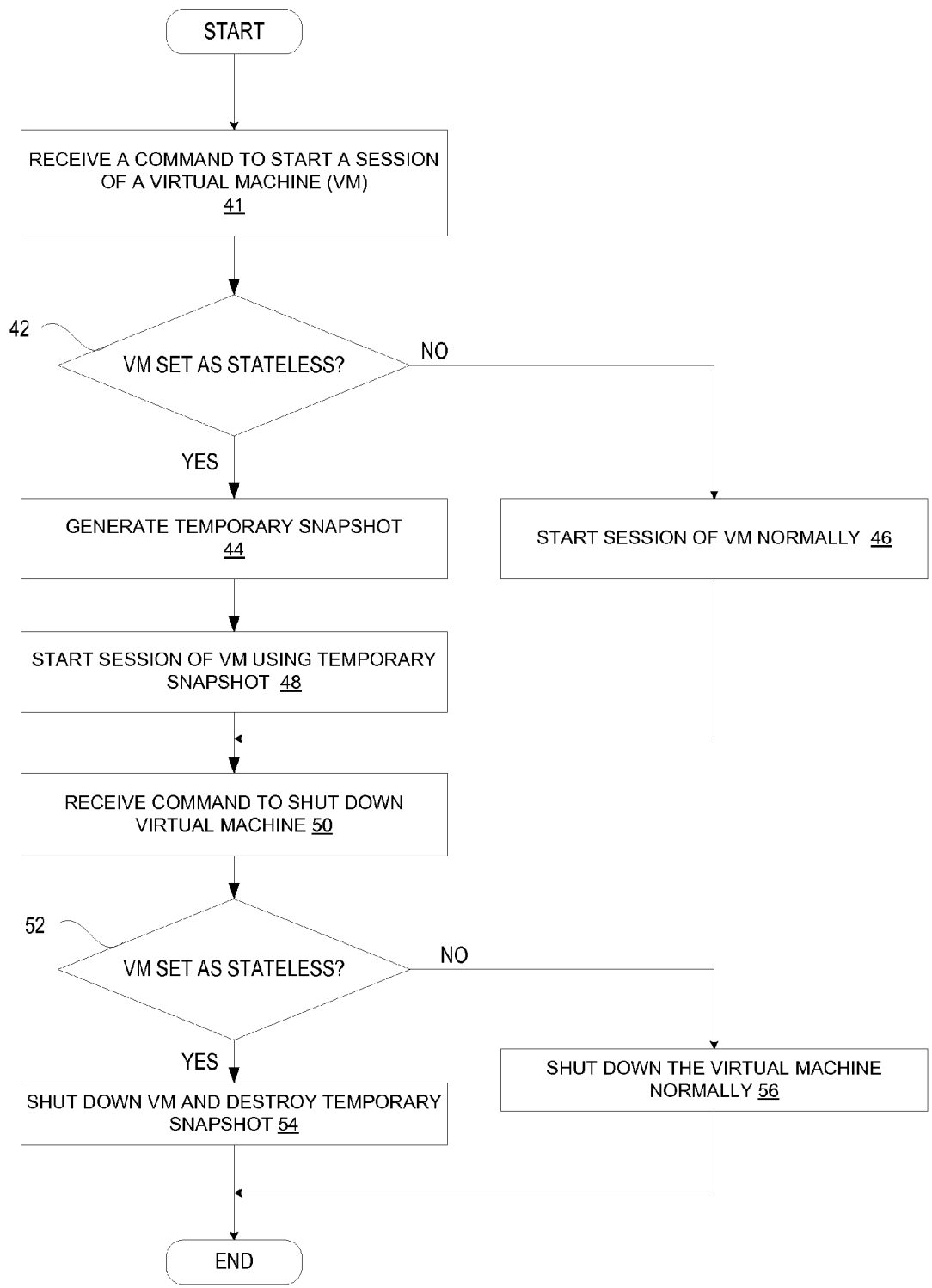
FIG. 6 illustrates a flow diagram of one embodiment of a method to load a stateless virtual machine.

In one embodiment, provisioning manager 30 determines whether the virtual machine to be provisioned should be provisioned as a stateless virtual machine. Any virtual machine provisioned as a stateless virtual machine will not keep any changes that are made to it during a session of the virtual machine. In one embodiment, the provisioning manager 30 checks the client request for a virtual machine to see if the client requested that the virtual machine be stateless. If the request indicated that the virtual machine should be stateless, then the provisioning manager 30 will provision the virtual desktop in a stateless manner. Alternatively, the requested virtual machine may be configured to always be stateless. Such virtual machines would also be provisioned in a stateless manner. FIG. 6 below discusses how to load virtual machines in a stateless manner.

FIG. 6 illustrates a flow diagram of one embodiment of a method to load a virtual machine. The method may be performed by processing logic that may comprise hardware (e.g., circuitry, dedicated logic, programmable logic, microcode, etc.), software (such as instructions run on a processing device), firmware, or a combination thereof. In one embodiment, the method is performed by host controller 25 and/or host 10 of FIG. 5.

Referring to FIG. 6, at block 41, processing logic receives a command to start a session of a virtual machine. The command may be received from a client that relies on the virtual machine for a desktop environment (e.g., all the functionality of a desktop computer). In one embodiment, the command is a command to start a virtual desktop.

At block 42, the processing logic determines whether the requested virtual machine is set as stateless. A stateless virtual machine is a virtual machine that will not save any changes that are made to it during a session. In one embodiment, the virtual machine has been configured to be stateless for all sessions. In such an embodiment, the virtual machine will be started in a stateless mode regardless of whether or not a user has requested that the virtual machine be stateless. In another embodiment, the command includes instructions from a user to start this particular session in a stateless mode. The user may be provided the option of requesting that the virtual machine be started in a stateless mode when he sends the command.

Running the virtual machine in a stateless mode may be useful, for example, if the virtual machine is to be used in a public setting, such as at a school, library, etc. The stateless mode may also be useful for quality analysis, so that the same state can be checked repeatedly. Moreover, use of the stateless mode can provide increased security (e.g., by removing any potential malware after each session). If the virtual machine is set as stateless, then a stateless mode is entered, and the method proceeds to block 44. If the virtual machine is not set as stateless, a standard mode is entered, and the method proceeds to block 46.

At block 46, the session of the virtual machine is started normally. Thus, during the session, files may be saved to disk, new applications may be installed, etc., and these changes will be present in subsequent sessions.

At block 44, the processing logic generates a temporary snapshot of the current state of the virtual machine. At block 48, the session of the virtual machine is started using the temporary snapshot. During the session, a user may save files, install new applications, and so forth. These new files, applications, etc. will remain in the virtual machine for the life of the session. However, all of these changes will be lost when the session is terminated.

At block 50, a command is received to shut down the virtual machine. At block 52, if the virtual machine is set as stateless (in stateless mode), the method proceeds to block 54. If the virtual machine is not set as stateless (in standard mode), the method proceeds to block 56.

At block 56, the virtual machine is shut down normally. At block 54, the virtual machine is shut down, and the temporary snapshot (including all changes that have been made to the virtual machine during the session) is destroyed (e.g., deleted). Thus, the next time a new session of the virtual machine is started, it will be started with the state that the virtual machine had before the previous session took place. If the stateless mode is used, temporary snapshot generation and deletion can be handled automatically, so that a user does not need to perform any manual tasks relating to the snapshot, or otherwise manage the snapshot.

The method then ends.

In one embodiment, a temporary snapshot is generated from a current state of a virtual machine. In another embodiment, instead of generating temporary snapshots from the current state of the virtual machines, a temporary snapshot is generated from a pristine snapshot. Pristine snapshots are snapshots that are taken of a virtual machine while the virtual machine is in a known, desired state. For example, a pristine snapshot may include the state of the virtual machine after the operating system and/or a few desired applications have been installed in the virtual machine. Temporary snapshots generated from pristine snapshots may be copies of the pristine snapshots.

FIG. 1A illustrates a flow diagram of one embodiment of a method to create a pristine snapshot. The method may be performed by processing logic that may comprise hardware (e.g., circuitry, dedicated logic, programmable logic, microcode, etc.), software (such as instructions run on a processing device), firmware, or a combination thereof. For instance, at least part of the method may be performed by the processing device 210 illustrated in FIG. 2 in some embodiments.

Initially, processing logic receives inputs from an administrator (processing block 110). The inputs may include instruction on which operating system to install and which tools to install in a virtual machine. As used herein, virtualization broadly refers to emulation of physical hardware, and a virtual machine broadly refers to a software implementation of a machine that executes programming instructions to perform operations and tasks as if executed by a physical machine. A virtual machine may be a virtual host or a virtual guest. Then processing logic starts a virtual machine (processing block 111) and installs an operating system and tools on the virtual machine according to the inputs from the administrator (processing block 112). Then processing logic shuts down the virtual machine (processing block 114).

In some embodiments, processing logic takes a snapshot of the virtual machine (processing block 116). A snapshot includes a point-in-time image of a configuration of the virtual machine, including the operating system and the tools installed, and the data stored in the computer file system hosting the virtual machine. Then processing logic stores the snapshot as a pristine snapshot in a computer-readable medium (processing block 118). A pristine snapshot as used herein refers to a substantially perfect image of the desired configuration of the virtual machine, and the pristine snapshot generally remains unchanged once it is created. The computer-readable medium may include non-removable computer-readable medium (e.g., a hard drive in a server) or removable computer-readable medium (e.g., a flash drive, a CD, etc.). The pristine snapshot may be used later to start other virtual machines in order to reproduce the same computing environment as the virtual machine shut down.

Figure 1B:
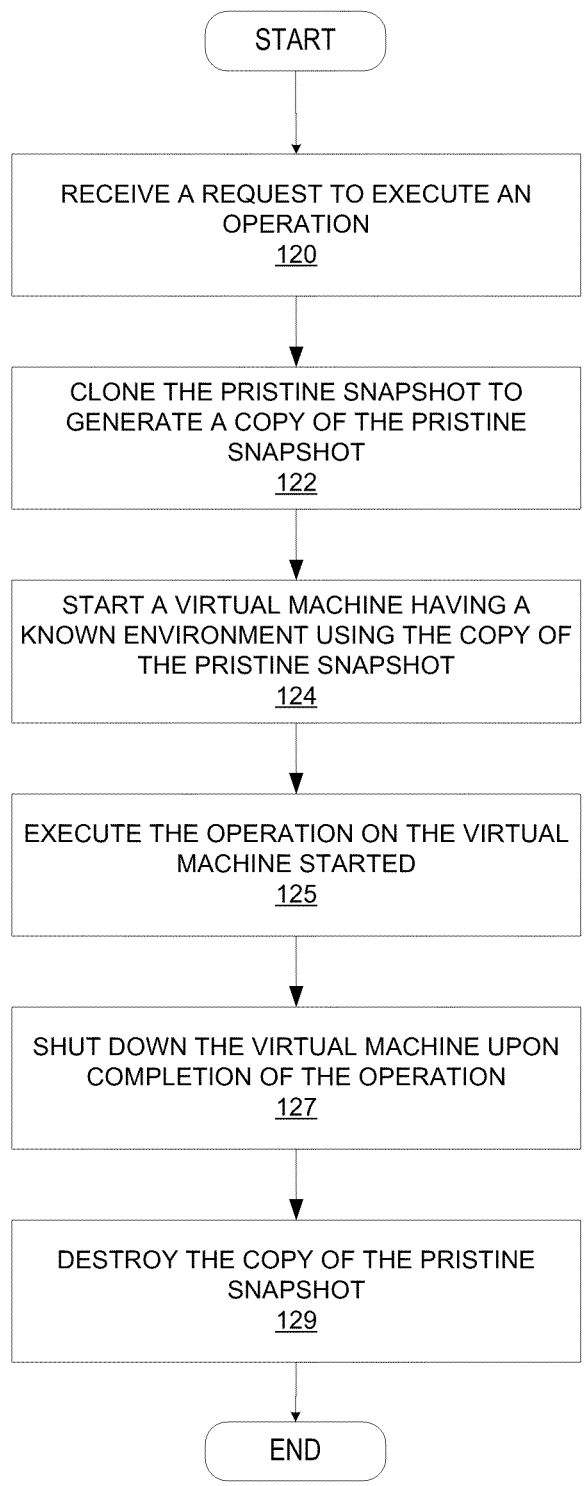
FIG. 1B illustrates a flow diagram of one embodiment of a method to execute an operation in a known and reproducible environment.

FIG. 1B illustrates a flow diagram of one embodiment of a method to execute an operation in a known and reproducible environment. The method may be performed by processing logic that may comprise hardware (e.g., circuitry, dedicated logic, programmable logic, microcode, etc.), software (such as instructions run on a processing device), firmware, or a combination thereof. For instance, at least part of the method may be performed by the processing device 210 illustrated in FIG. 2 in some embodiments.

Initially, processing logic receives a request to execute an operation (processing block 120). The operation may constitute a single task or the operation is part of a task. To prepare for executing the operation, processing logic clones the pristine snapshot to generate a copy of the pristine snapshot (processing block 122). Then processing logic starts a virtual machine with a known environment using the copy of the pristine snapshot (processing block 124). Processing logic executes the operation on the virtual machine started (processing block 125).

Upon completion of the operation, processing logic shuts down the virtual machine (processing block 127) and destroys the copy of the pristine snapshot (processing block 129). Note that during execution of the operation, the computing environment of the virtual machine may be changed as a result of the execution, and hence, the copy of the pristine snapshot used to start the virtual machine may be changed. Therefore, by using the copy of the pristine snapshot instead of the actual pristine snapshot, the actual pristine snapshot can be preserved and protected from changes. As such, the computing environment of every virtual machine started using a copy of the pristine snapshot can be guaranteed to be the same. Furthermore, there is no need to recreate the environment from scratch each time a virtual machine is started. For instance, it is useful in software testing to be able to readily start virtual machines having computing environment that is guaranteed to be the same. The pristine snapshot makes the process of starting multiple virtual machines having the same computing environment more convenient and reliable.

Figure 1C:
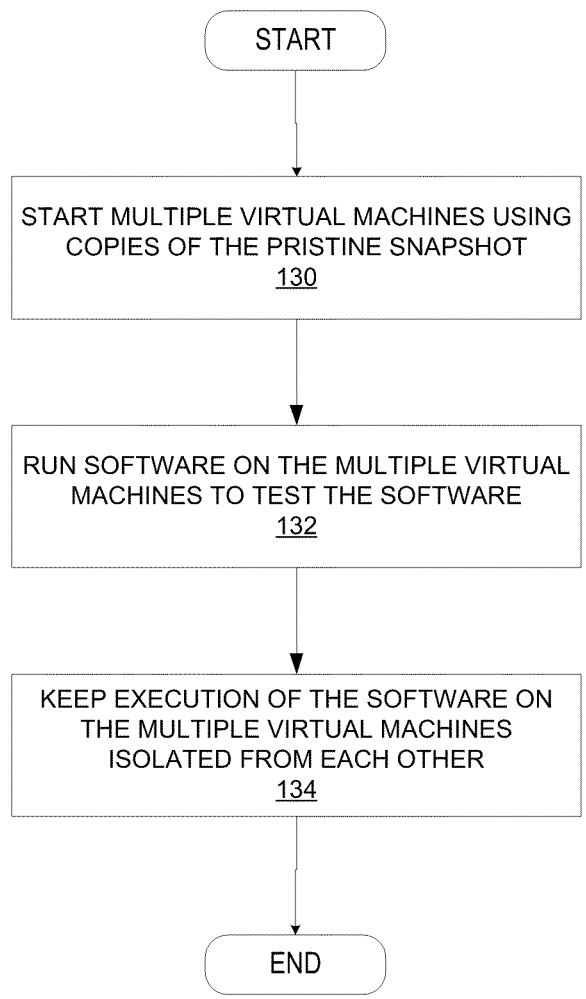
FIG. 1C illustrates a flow diagram of one embodiment of a method to test software.

FIG. 1C illustrates a flow diagram of one embodiment of a method to test software. The method may be performed by processing logic that may comprise hardware (e.g., circuitry, dedicated logic, programmable logic, microcode, etc.), software (such as instructions run on a processing device), firmware, or a combination thereof. For instance, at least part of the method may be performed by the processing device 210 illustrated in FIG. 2 in some embodiments.

Initially, processing logic starts multiple virtual machines using copies of the pristine snapshot (processing block 130). Because the copies of the pristine snapshot are the same initially, the computing environments of the multiple virtual machines started are the same. Then processing logic runs the software to be tested on these virtual machines (processing block 132). In some embodiments, the software run on the virtual machines may be of different versions. Processing logic keeps the execution of the software on the virtual machines isolated from each other (processing block 134).

Figure 2:
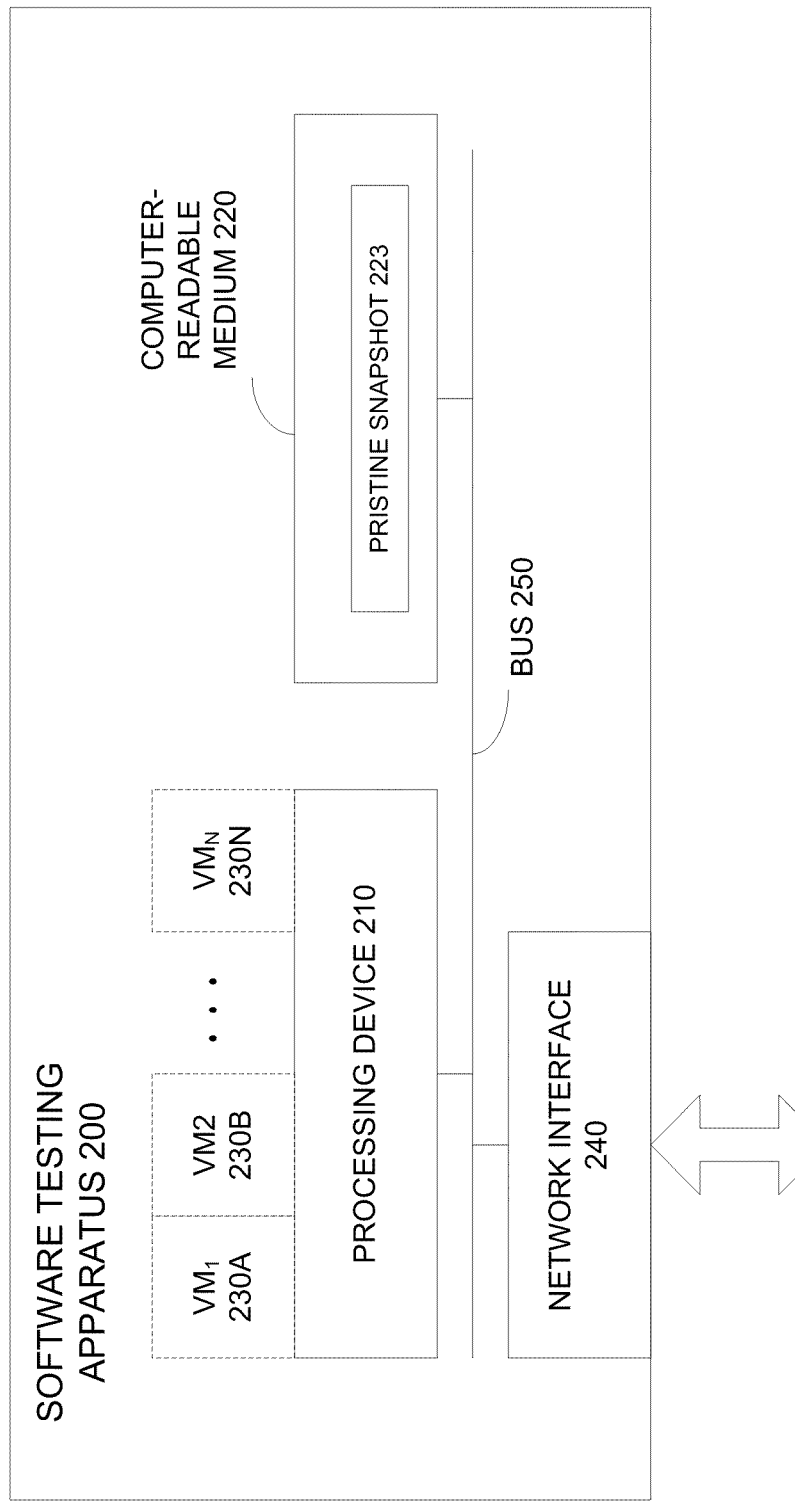
FIG. 2 illustrates a one embodiment of a software testing apparatus.

FIG. 2 illustrates one embodiment of a software testing apparatus. The software testing apparatus 200 may be implemented using a computer system (e.g., a server, a personal computer, a workstation, etc.). One exemplary computer system usable to implement personal the software testing apparatus 200 is shown in details in FIG. 4.

In some embodiments, the software testing apparatus 200 includes a processing device 210, a computer-readable medium 220, and a network interface 240, coupled to each other via a bus 250. The processing device 210 may start one or more virtual machines, such as virtual machines 230*a*-230*n*. The virtual machines may or may not be started at the same time, and they may or may not be shut down at the same time.

In order to provide a known and reproducible computing environment for multiple virtual machines, the processing device 210 may initially start a virtual machine and install an operating system and one or more tools on the virtual machine according to administrator inputs. Then the processing device 210 may shut down the virtual machine and take a snapshot of the virtual machine. The snapshot of the virtual machine is stored in the computer-readable medium 220 as a pristine snapshot 223.

When the processing device 210 receives a request to execute an operation, the processing device 210 may start a virtual machine using a copy of the pristine snapshot 223. In some embodiments, the processing device 210 accesses the pristine snapshot 223 and clones the pristine snapshot 223 by making a copy of the pristine snapshot 223. Note that the actual pristine snapshot 223 in the computer-readable medium 220 remains unchanged. Using the copy of the pristine snapshot 223, the processing device 210 starts a virtual machine having the same computing environment as the computing environment of the virtual machine initially started to create the pristine snapshot 223. Then the processing device 210 executes the operation on the newly started virtual machine. Note that execution of the operation may change the computing environment of the newly started virtual machine. Therefore, upon completion of the operation, the processing device 210 shuts down this virtual machine and destroys the copy of the pristine snapshot 223. In sum, the pristine snapshot 223 allows the processing device 210 to readily start virtual machines having a known and reproducible environment without starting from scratch every time.

Using the above approach, the software testing apparatus 200 can test software repeatedly using virtual machines having the known and reproducible environment. Upon completion of testing, the processing device 210 may build a final version of the software and deploy (or push) the final version of the software via the network interface 240 to a code repository.

Note that any or all of the components of the software testing apparatus 200 and associated hardware may be used in various embodiments of the present invention. However, it can be appreciated that other configurations of the software testing apparatus 200 may include more or fewer components than those discussed above. The processing device 210 and the computer-readable medium 220, etc., are illustrative examples of components in the software testing apparatus 200. One should appreciate that other types of components and/or devices may be included in the software testing apparatus 200 in other embodiments.

Figure 3:
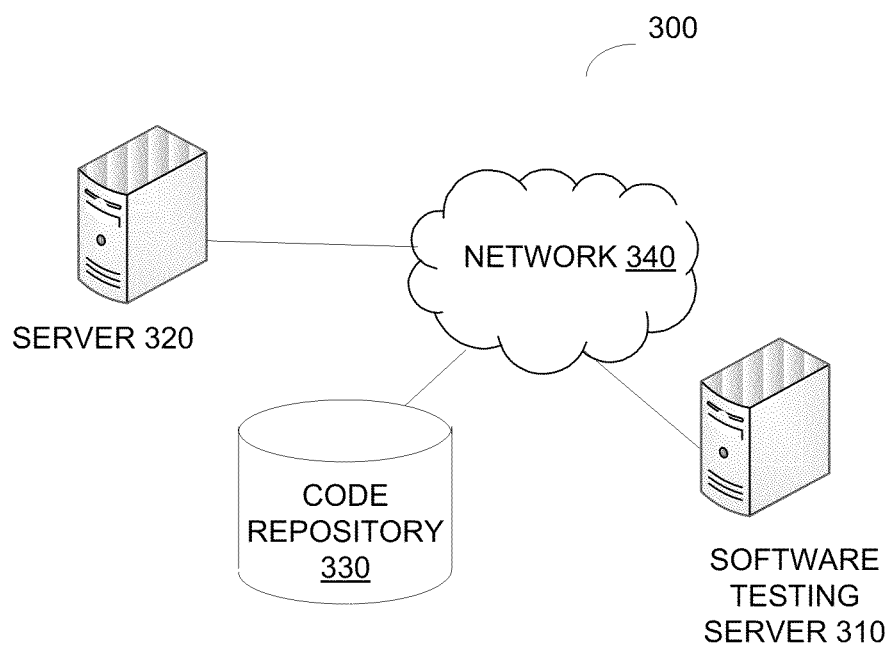
FIG. 3 illustrates one embodiment of a software deployment system.

FIG. 3 illustrates one embodiment of a software deployment system. The software deployment system 300 includes a software testing server 310, a server 320, and a code repository 330, coupled to each other via a network 340. The software testing server 310 may be implemented with a software testing apparatus, such as the software testing apparatus 200 shown in FIG. 2. Details of some embodiments of the software testing apparatus have been discussed above. The server 320 may be implemented using a computer system, such as the computer system 400 shown in FIG. 4, which is discussed in details below. The code repository 330 includes one or more databases made of computer-readable media to store programming code, which may include one or more of source code, executable files, object code, etc.

The network 340 may include various types of networks, such as a local area network (LAN), a wide area network (WAN), an intranet, the Internet, etc. The servers 310 and 320 and the code repository 330 are illustrative examples of devices communicatively coupled to the network 340. It should be apparent that various types of devices may communicatively couple to the network 340 in other embodiments, such as a desktop personal computer (PC), a laptop PC, a personal digital assistant (PDA), a mobile telephone, etc.

In some embodiments, the software testing server 310 starts a virtual machine and installs an appropriate operating system and tools on the virtual machine according to administrator inputs. Then the software testing server 310 shuts down the virtual machine and takes a snapshot of the virtual machine. The snapshot is saved as a pristine snapshot on the software testing server 310. Using copies of the pristine snapshot, the software testing server 310 may start multiple virtual machines having the same computing environment. The software testing server 310 may run different versions of software on these virtual machines in order to test the software. After testing the software and finding the software to be of satisfactory quality, the software testing server 310 may push the code of the software to the code repository 330 via the network 340. The code of the software in the code repository 330 may be accessed by other computing machines or computing devices, such as the server 320, via the network 340.

Figure 4:
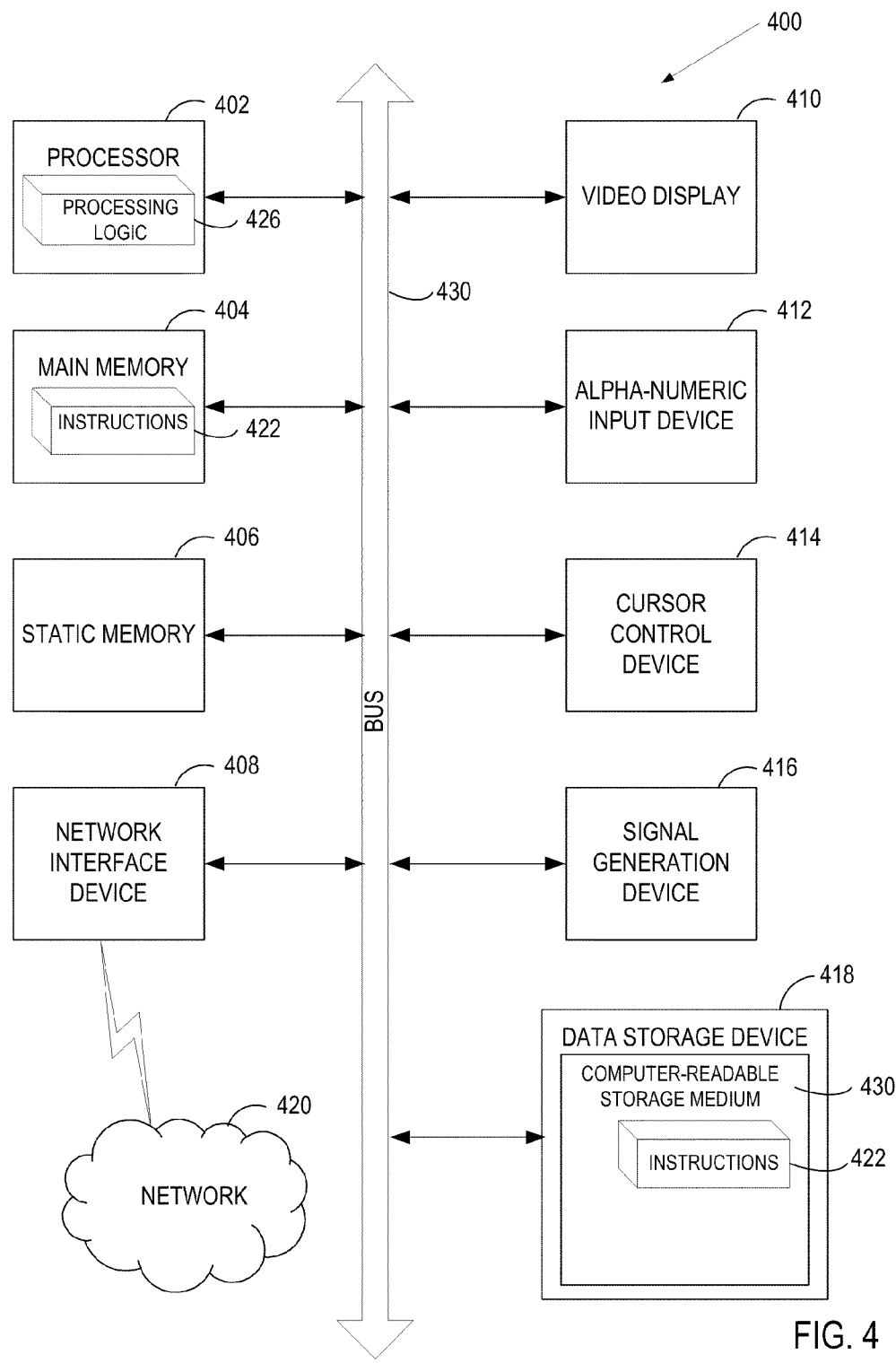
FIG. 4 illustrates a block diagram of an exemplary computer system.

FIG. 4 illustrates a diagrammatic representation of a machine in the exemplary form of a computer system 400 within which a set of instructions, for causing the machine to perform any one or more of the methodologies discussed herein, may be executed. In alternate embodiments, the machine may be connected (e.g., networked) to other machines in a LAN, an intranet, an extranet, and/or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 400 includes a processing device 402, a main memory 404 (e.g., read-only memory (ROM), flash memory, dynamic random access memory (DRAM) such as synchronous DRAM (SDRAM) or Rambus DRAM (RDRAM), etc.), a static memory 406 (e.g., flash memory, static random access memory (SRAM), etc.), and a data storage device 418, which communicate with each other via a bus 430.

Processing device 402 represents one or more general-purpose processing devices such as a microprocessor, a central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 402 may also be one or more special-purpose processing devices such as an application specific integrated circuit (ASIC), a field programmable gate array (FPGA), a digital signal processor (DSP), network processor, or the like. The processing device 402 is configured to execute the processing logic 426 for performing the operations and steps discussed herein.

The computer system 400 may further include a network interface device 408. The computer system 400 also may include a video display unit 410 (e.g., a liquid crystal display (LCD) or a cathode ray tube (CRT)), an alphanumeric input device 412 (e.g., a keyboard), a cursor control device 414 (e.g., a mouse), and a signal generation device 416 (e.g., a speaker).

The data storage device 418 may include a computer-accessible storage medium 430 (also known as a computer-readable storage medium) on which is stored one or more sets of instructions (e.g., software 422) embodying any one or more of the methodologies or functions described herein. The software 422 may also reside, completely or at least partially, within the main memory 404 and/or within the processing device 402 during execution thereof by the computer system 400, the main memory 404 and the processing device 402 also constituting computer-accessible storage media. The software 422 may further be transmitted or received over a network 420 via the network interface device 408.

While the computer-readable storage medium 430 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present invention. The term "computer-readable storage medium" shall accordingly be taken to include, but not be limited to, solid-state memories, optical and magnetic media, etc.

Thus, some embodiments of performing tasks in a known and reproducible environment using snapshotting and virtualization have been described. It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method comprising:
   prior to starting a first virtual machine, determining in view of user input that the first virtual machine is to be started in a standard mode;
   generating a snapshot of a state of a second virtual machine, wherein the second virtual machine is for a virtual desktop that provides a desktop environment;
   in response to a request to execute an operation and a determination that the first virtual machine is not to be started in a stateless mode, starting, by a processing device, a session of the first virtual machine using the snapshot;
   providing the desktop environment to a remote client during the session by the first virtual machine;
   executing the operation in relation to the session of the first virtual machine as started using the snapshot; and
   destroying, without user input and when the session is terminated, changes made during the session to the first virtual machine as started using the snapshot.

2. The method of claim 1, wherein the processing device is a public computing device.

3. The method of claim 1, wherein the processing device is executing a provisioning manager.

4. The method of claim 1, further comprising destroying the snapshot when the session is terminated.

5. The method of claim 1, further comprising:
   loading the first virtual machine to start the session of the first virtual machine in the state;
   providing the desktop environment to the remote client during the session by the first virtual machine; and
   recording changes made to the state during the session.

6. The method of claim 1, wherein the first virtual machine communicates with the remote client using a multichannel protocol that allows for connection between virtual machines and remote devices via individual channels.

7. The method of claim 1, further comprising:
   providing a user with an option to start the first virtual machine in the stateless mode or in the standard mode.

8. A non-transitory computer readable storage medium including instructions that, when executed by a processing device, cause the processing device to:
prior to starting a first virtual machine, determine in view of user input that the first virtual machine is to be started in a standard mode;
generate a snapshot of a state of a second virtual machine, wherein the second virtual machine is for a virtual desktop that provides a desktop environment;
in response to a request to execute an operation and a determination that the first virtual machine is not to be started in a stateless mode, start a session of the first virtual machine using the snapshot;
provide the desktop environment to a remote client during the session by the first virtual machine;
execute the operation in relation to the session of the first virtual machine as started using the snapshot; and
destroy, without user input and when the session is terminated, changes made during the session to the first virtual machine as started using the snapshot.

9. The non-transitory computer readable storage medium of claim 8, wherein the processing device is a public computing device.

10. The non-transitory computer readable storage medium of claim 8, wherein the processing device executes a provisioning manager.

11. The non-transitory computer readable storage medium of claim 8, the operations further comprising destroying the snapshot when the session is terminated.

12. The non-transitory computer readable storage medium of claim 8, the operations further comprising:
load the first virtual machine to start the session of the first virtual machine in the state;
provide the desktop environment to the remote client during the session by the first virtual machine; and
record changes made to the state during the session.

13. The non-transitory computer readable storage medium of claim 8, wherein the first virtual machine communicates with the remote client using a multichannel protocol that allows for connection between virtual machines and remote devices via individual channels.

14. The non-transitory computer readable storage medium of claim 8, the operations further comprising:
provide a user with an option to start the first virtual machine in the stateless mode or in the standard mode.

15. A device comprising:
a memory comprising instructions for a virtual desktop server that provisions virtual machines; and
a processing device, operatively connected to the memory, to execute the instructions and to:
determine, prior to a starting of a first virtual machine and in view of user input, that the first virtual machine is to be started in a standard mode;
generate a snapshot of a state of a second virtual machine, wherein the second virtual machine is for a virtual desktop that provides a desktop environment;
in response to a request to execute an operation and a determination that the first virtual machine is not to be started in a stateless mode, start a session of the first virtual machine using the snapshot;
provide the desktop environment to a remote client during the session by the first virtual machine;
execute the operation in relation to the session of the first virtual machine as started using the snapshot; and
destroy, without user input and when the session is terminated, changes made during the session to the first virtual machine as started using the snapshot.

16. The device of claim 15, wherein the remote client is a public computing device.

17. The device of claim 15, wherein the processing device is to destroy the snapshot when the session is terminated.

18. The device of claim 15, wherein the processing device is further to:
load the first virtual machine to start the session of the first virtual machine in the state;
provide the desktop environment to the remote client during the session by the first virtual machine; and
record changes made to the state during the session.

19. The device of claim 15, wherein the first virtual machine is to communicate with the remote client using a multichannel protocol that allows for connection between virtual machines and remote devices via individual channels.

20. The device of claim 15, wherein the processing device is further to provide the user with an option to start the first virtual machine in the stateless mode or in the standard mode.

* * * * *